US009100305B2

(12) United States Patent
Hui et al.

(10) Patent No.: US 9,100,305 B2
(45) Date of Patent: Aug. 4, 2015

(54) EFFICIENT ADMISSION CONTROL FOR LOW POWER AND LOSSY NETWORKS

(75) Inventors: Jonathan W. Hui, Foster City, CA (US); Jean-Philippe Vasseur, Saint Martin Duriage (FR); Karthikeyan Ganesan, Campbell, CA (US); Vikram Jayaraman, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 13/180,938

(22) Filed: Jul. 12, 2011

(65) Prior Publication Data

US 2013/0019005 A1 Jan. 17, 2013

(51) Int. Cl.
| | | |
|---|---|---|
| *G06F 15/173* | (2006.01) | |
| *G06F 15/16* | (2006.01) | |
| *H04L 12/26* | (2006.01) | |
| *H04L 12/911* | (2013.01) | |
| *H04L 12/24* | (2006.01) | |
| *H04L 12/801* | (2013.01) | |

(52) U.S. Cl.
CPC ........ *H04L 43/0876* (2013.01); *H04L 41/0896* (2013.01); *H04L 47/70* (2013.01); *H04L 47/781* (2013.01); *H04L 47/822* (2013.01); *H04L 47/10* (2013.01)

(58) Field of Classification Search
CPC ............ H04L 12/4625; H04L 12/5695; H04L 12/189; H04L 41/0893; H04L 45/00; H04L 47/10–47/11; H04L 47/125
USPC .................... 370/238, 338, 295.41, 229–237, 370/252–255, 351–352, 389–401, 329, 248, 370/312; 709/235, 238, 221–228
See application file for complete search history.

(56) References Cited

U.S. PATENT DOCUMENTS

| | | | | |
|---|---|---|---|---|
| 5,970,064 A | * | 10/1999 | Clark et al. | 370/351 |
| 6,487,170 B1 | * | 11/2002 | Chen et al. | 370/231 |
| 6,651,101 B1 | * | 11/2003 | Gai et al. | 709/224 |
| 7,257,632 B2 | * | 8/2007 | Zhang et al. | 709/226 |
| 7,477,659 B1 | | 1/2009 | Nee et al. | |
| 7,624,181 B2 | | 11/2009 | Townsley et al. | |
| 7,680,036 B2 | * | 3/2010 | Yang et al. | 370/229 |

(Continued)

OTHER PUBLICATIONS

Chan et al, "COPS USage for Policy Provisioning (COPS-PR)", IETF RFC 3084, Mar. 2001.*

(Continued)

*Primary Examiner* — Wing F Chan
*Assistant Examiner* — Raji Krishnan
(74) *Attorney, Agent, or Firm* — Parker Ibrahim & Berg LLC; James M. Behmke; Stephen D. LeBarron

(57) ABSTRACT

In one embodiment, a centralized network management server (NMS) determines a network state of a low power and lossy network (LLN) based on resource utilization due to traffic in the LLN. The NMS also determines an admission state based on the network state, and admission control (network-wide and/or localized control) based on the admission state. As such, the centralized NMS can then administer the admission control for all nodes in the LLN, where network-wide control comprises a single control command to all nodes in the LLN, and the nodes direct admission based on the control command, and where localized control comprises a request-response exchange between the nodes and the centralized NMS, and the NMS directs admission on a per-request basis.

18 Claims, 12 Drawing Sheets

(56) References Cited

U.S. PATENT DOCUMENTS

| | | | |
|---|---|---|---|
| 7,822,064 | B2 | 10/2010 | Thubert et al. |
| 7,835,276 | B2 | 11/2010 | Naik et al. |
| 7,903,817 | B2 | 3/2011 | Cam-Winget et al. |
| 7,940,765 | B2 | 5/2011 | Rao et al. |
| 7,961,715 | B1 | 6/2011 | Dhesikan et al. |
| 2006/0203773 | A1* | 9/2006 | Georges et al. ............... 370/329 |
| 2006/0251114 | A1* | 11/2006 | Nuggehalli et al. ........... 370/466 |
| 2006/0291383 | A1* | 12/2006 | Bi et al. ........................ 370/229 |
| 2007/0147320 | A1* | 6/2007 | Sattari et al. .................. 370/338 |
| 2008/0049753 | A1* | 2/2008 | Heinze et al. ................. 370/392 |
| 2008/0151807 | A1* | 6/2008 | Meier et al. ................... 370/312 |
| 2008/0219186 | A1* | 9/2008 | Bell et al. ...................... 370/254 |
| 2008/0225737 | A1 | 9/2008 | Gong et al. |
| 2008/0235158 | A1* | 9/2008 | Manchala et al. ............. 705/400 |
| 2008/0247314 | A1* | 10/2008 | Kim et al. ...................... 370/235 |
| 2009/0019163 | A1* | 1/2009 | Pecus ............................. 709/226 |
| 2009/0028161 | A1* | 1/2009 | Fullarton et al. .......... 370/395.41 |
| 2009/0092113 | A1* | 4/2009 | Doshi et al. ................... 370/338 |
| 2010/0082557 | A1 | 4/2010 | Gao et al. |
| 2010/0142524 | A1* | 6/2010 | Garofalo et al. .............. 370/389 |
| 2010/0157838 | A1* | 6/2010 | Vaswani et al. ............... 370/252 |
| 2011/0019551 | A1* | 1/2011 | Adams et al. ................. 370/235 |
| 2012/0176894 | A1* | 7/2012 | Cai et al. ....................... 370/230 |

OTHER PUBLICATIONS

"RPL: IPv6 Routing Protocol for Low Power and Lossy Networks" <draft-ietf-roll-rpl-19> by Winter, at al. (Mar. 13, 2011 version).

\* cited by examiner

US 9,100,305 B2

EFFICIENT ADMISSION CONTROL FOR LOW POWER AND LOSSY NETWORKS

TECHNICAL FIELD

The present disclosure relates generally to computer networks, and, more particularly, to admission control for low power and lossy networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. A primary challenge for LLNs is to make effective use of the limited and dynamic network capacity.

Existing and widely deployed approaches to Quality of Service (QoS) and Call Admission Control (CAC) typically used in "classic" IP networks are for the most part ill-suited for LLNs. Heavy signaling can easily overwhelm the limited network capacity and strict resource reservation mechanisms cannot operate effectively when there are not enough resources to allocate (limited memory). In current IP networks, there are two paradigms used to meet SLAs (Service Level Agreement) in networks carrying flows with different characteristics and QoS requirements: 1) Use of QoS: edge traffic marking (IPv6 DS byte), queuing disciplines, Random Early Detection/Discard, etc.; and 2) CAC using signaling (e.g., RSVP) in the network to perform explicit bandwidth reservation.

What QoS provides is the ability to prioritize critical traffic but this implies potential large packet buffering, which may be problematic on nodes with very limited resources. CAC using a protocol such as RSVP allows for explicit bandwidth reservation between the source and destination, however such explicit CAC requires potentially heavy state maintenance.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
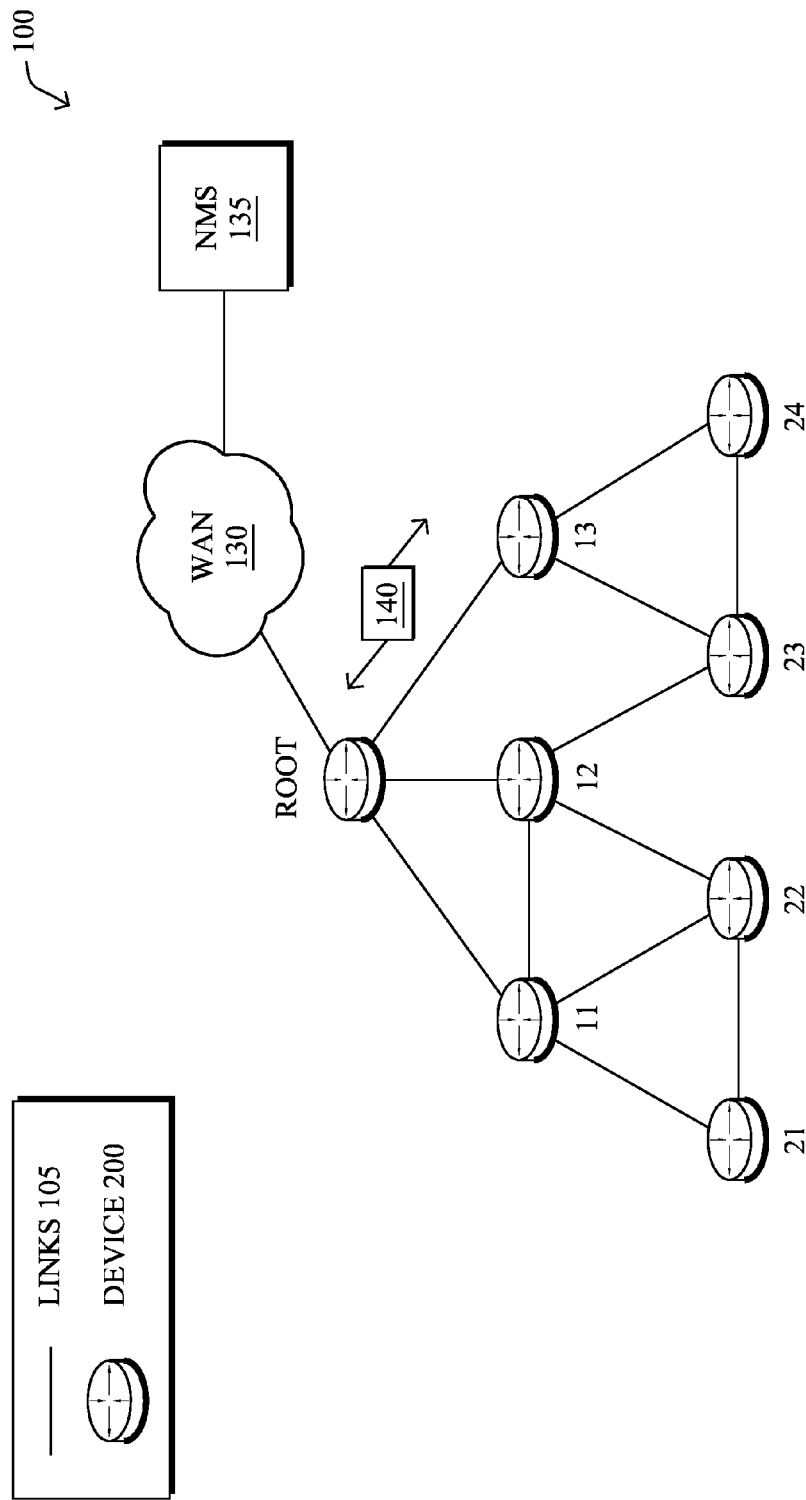
FIG. 1 illustrates an example communication network.

According to one or more embodiments of the disclosure, a centralized network management server (NMS) determines a network state of a low power and lossy network (LLN) based on resource utilization due to traffic in the LLN. The NMS also determines an admission state based on the network state, and admission control (network-wide and/or localized control) based on the admission state. As such, the centralized NMS can then administer the admission control for all nodes in the LLN, where network-wide control comprises a single control command to all nodes in the LLN, and the nodes direct admission based on the control command, and where localized control comprises a request-response exchange between the nodes and the centralized NMS, and the NMS directs admission on a per-request basis.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "24," and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Also, the root node may be configured to provide access for the local computer network (e.g., nodes 11-24) to and from a global computer network, e.g., WAN 130. Also, as described below, the WAN 130 may comprise or provide access to a Network Management System/Server (NMS) 135. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
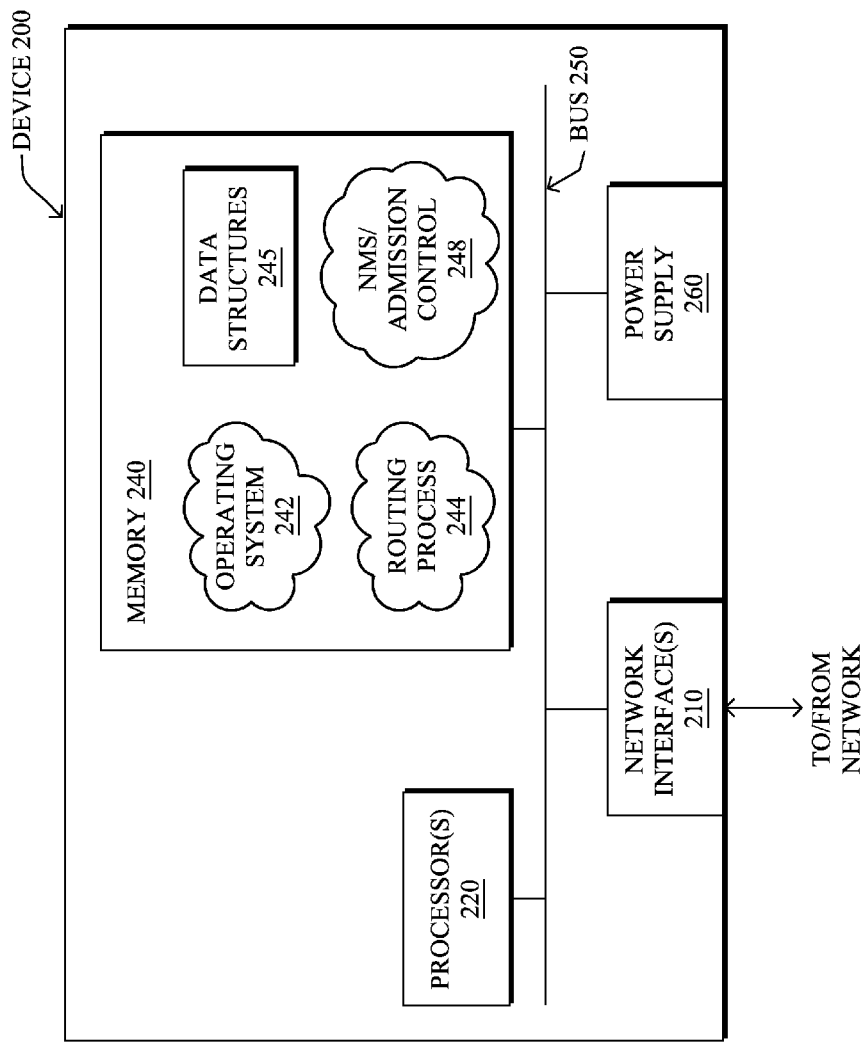
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative "NMS/Admission Control process" 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19>by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

In particular, a DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by routing process 244) based on an Objective Function (OF). The role of the Objective Function is generally to specify rules on how to build the DAG (e.g. number of parents, backup parents, etc.).

Also, while one dominant application for LLNs is to support Automated Meter Reading (AMR), such networks may also be used to support multiple applications simultaneously. As such, LLNs may be used to provide a multi-service network infrastructure. For instance, other example applications include Distribution Automation (DA), plug-in electric vehicles, etc. Such applications typically involve different traffic characteristics and requirements (i.e., point-to-point vs. multipoint-to-point and latency bounds).

As noted above, a primary challenge for LLNs is to make effective use of the limited and dynamic network capacity. Existing and widely deployed approaches to Quality of Service (QoS) and Call Admission Control (CAC) typically used in "classic" IP networks are for the most part ill-suited for LLNs. Heavy signaling can easily overwhelm the limited network capacity and strict resource reservation mechanisms cannot operate effectively when there are not enough resources to allocate (limited memory). In current IP networks, there are two paradigms used to meet SLAs (Service Level Agreement) in networks carrying flows with different characteristics and QoS requirements: 1) Use of QoS: edge traffic marking (IPv6 DS byte), queuing disciplines, Random Early Detection/Discard, etc.; and 2) CAC using signaling (e.g., RSVP) in the network to perform explicit bandwidth reservation.

What QoS provides is the ability to prioritize critical traffic but this implies potential large packet buffering, which may be problematic on nodes with very limited resources. CAC using a protocol such as RSVP allows for explicit bandwidth reservation between the source and destination, however such explicit CAC requires potentially heavy state maintenance.

Efficient Admission Control for LLNs

The techniques herein propose a lightweight NMS-based admission control that does not require explicit (e.g., in-band) signaling, such as with the known RSVP protocol. The approach specified herein relies on the ability for the network to define states that are used for implicit admission control at the edge of the network, without requiring explicit signaling. Control may be network-wide, or localized, and may include control over whether a node joins a particular network in the first place or whether it can send traffic at specific times.

Specifically, according to one or more embodiments of the disclosure as described in detail below, a centralized network management server (NMS) determines a network state of a low power and lossy network (LLN) based on resource utilization due to traffic in the LLN. The NMS also determines an admission state based on the network state, and admission control (network-wide and/or localized control) based on the admission state. As such, the centralized NMS can then administer the admission control for all nodes in the LLN, where network-wide control comprises a single control command to all nodes in the LLN, and the nodes direct admission based on the control command, and where localized control comprises a request-response exchange between the nodes and the centralized NMS, and the NMS directs admission on a per-request basis.

Illustratively, the techniques described herein may be performed by hardware, software, and/or firmware, such as in accordance with the NMS/Admission Control process 248, which may contain computer executable instructions executed by the processor 220 (e.g., on an NMS 135 and/or a device 200) to perform functions relating to the novel techniques described herein. For example, the techniques herein may be treated as extensions or alternatives to conventional admission control protocols, and as such, may be processed by similar components understood in the art that execute those protocols, accordingly.

Figure 3:
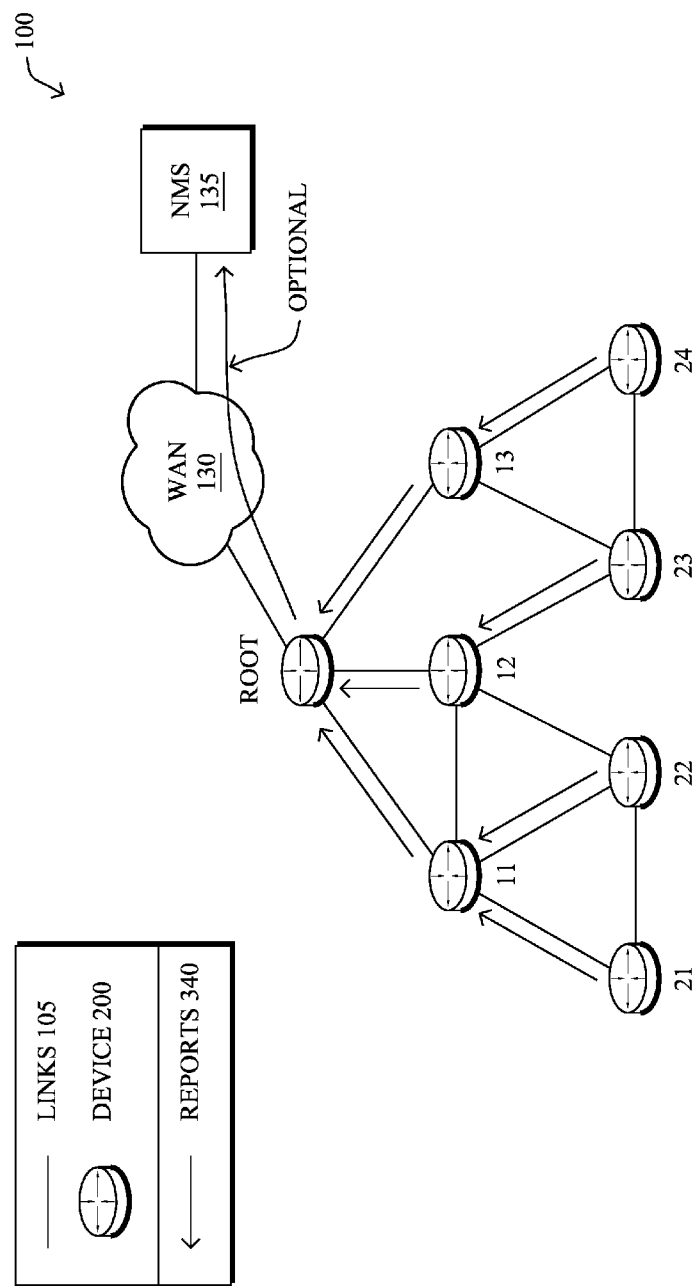
FIG. 3 illustrates an example reporting message exchange.

Operationally, the techniques herein first determine a "network state" of the computer network 100 (e.g., an LLN) based on resource utilization (such as the link and nodes resources) due to traffic in the LLN, from which an "admission state" may also be illustratively determined. In other words, the first component of the techniques herein involves centrally monitoring the network state. This may be done at the NMS 135 or the Root node (e.g., executing an NMS application 248). Each individual node (e.g., 11-24) monitors its local environment, such as its level of channel utilization or memory utilization, and reports its current state back to a central location. FIG. 3 illustrates an example propagation of such reports 340 from the LLN nodes to the root, and optionally to the external NMS 135 if used. For example, the state can be reported to a DAG root using RPL extensions or sent unicast to the NMS itself (e.g., using CoAP extensions, as may be understood by those skilled in the art). Upon receipt, the NMS device (root node or NMS 135) may aggregate the received reports to determine the network state of the LLN (e.g., congestion based on overall traffic, pockets of traffic, types of traffic, etc.).

Illustratively, a network administrator may define a set of admission states, "D," and their classification rules. The number of states, |D|, may be generally limited, however, |D| may grow in response to increasing link capabilities. In one embodiment, the NMS classifies the network state (information, data, etc.) into a particular admission state (classification decision based on the network state information). Alternatively, in another embodiment, each of the LLN nodes may classify their local network state information into a corresponding admission state, and then that admission state may be sent to the NMS for overall (or localized) admission state for the network. The set of admission states and their classification rules may be distributed to LLN devices in a number of ways (e.g., using DHCPv6, a distributed routing protocol such as RPL, etc.).

In one illustrative example, three hierarchical admission states (levels) may be defined (e.g., "green," "yellow," and "red") with the following example classification rules:

Green: [link utilization<X1] AND [ETX<Y1] AND [available memory>Z1], etc.;

Yellow: [X1<link utilization<X2] AND [Y1<ETX<Y2] AND [Z1<available memory<Z2]; and Red: [link utilization>X3 or ETX>Y3] AND [available memory<Z3 or CPU utilization>T].

The central controller (NMS, DAG root) is responsible for collecting the information and determining the admission state of the overall network. For example, the NMS may collect raw data (network state information), and then make a determination itself. Alternatively, each LLN device locally computes the current admission state based on the received classification rules and reports the current state to a central controller, e.g., using pre-defined rules to avoid states flaps.

The reports 340 may be sent periodically to refresh the information or may be triggered upon a state change. In the case where the LLN devices locally compute their admission state, those states may be aggregated, such as, for example, if more than 75% of the links/nodes in the network report a yellow state, the network state becomes yellow, whereas if more than 50% of the nodes reports a red state, the network state should become red. (These boundaries are merely examples for illustration, and any reasonable number of combinations may be established based on network configuration, accordingly).

Note that the scope of the admission state depends on the network structure. Furthermore, the central controller may define a hierarchical set of scopes. For example, the smallest scope may be dynamically determined based on local link connectivity reported by the nodes (e.g., nodes in a sub-DAG or a single DODAG within a instance). A larger scope may be based, for example, on an IEEE 802.15.4 personal area network (PAN) that is connected to other IP networks using a Field Area Router (FAR). An even larger scope may include a contiguous geographic area that includes multiple PANs. Note that the largest scope is defined by the set of nodes for which the central controller is responsible.

In accordance with the embodiments herein, the NMS determines admission control based on the admission state, where traffic flow characteristics suitable for the admission control are generally either network-wide or localized:

1) Network-wide: Some applications are distributed on the vast majority of devices (e.g., Automated Meter Reading) and communication flows through a small number of points (e.g., Field Area Routers). That is, application traffic of this type generally affects the entire network rather than localized portions of it, and may thus benefit from network-wide control.

2) Localized: Other applications are limited to a small fraction of devices and may involve localized communication (e.g., Distribution Automation), and may benefit from localized control.

As described in detail below, the embodiments described herein allocate resources (e.g., bandwidth) depending upon which of the two different classes of applications (data flows) is in question. Specifically, as detailed hereinafter, the centralized NMS may administer the admission control for all nodes in the LLN (not necessarily simultaneously, such as for localized control), where for network-wide control, a single control command 440 (with reference to FIG. 4) to all nodes in the LLN, and the nodes direct admission based on the control command, and where for localized control, a request-response exchange occurs between the nodes and the centralized NMS (with reference to FIGS. 5A-5D), and the NMS directs admission on a per-request basis.

Figure 4:
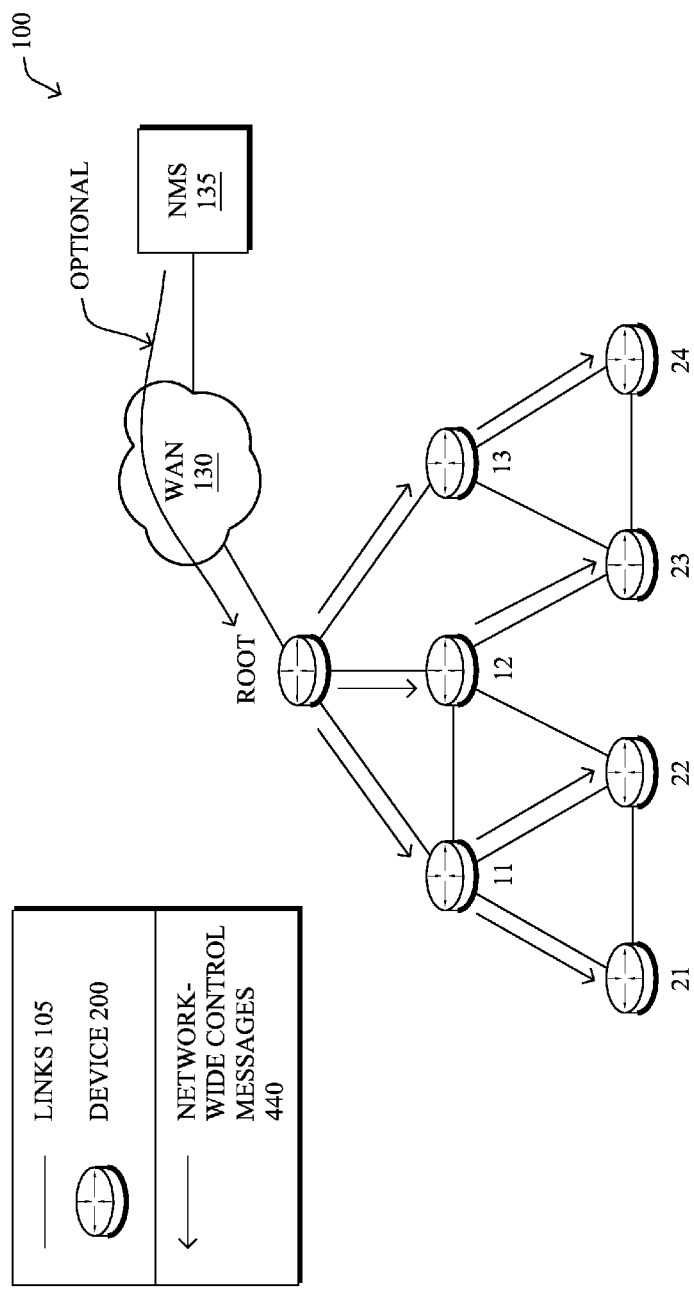
FIG. 4 illustrates an example network-wide admission control message exchange.
Figure 5A:
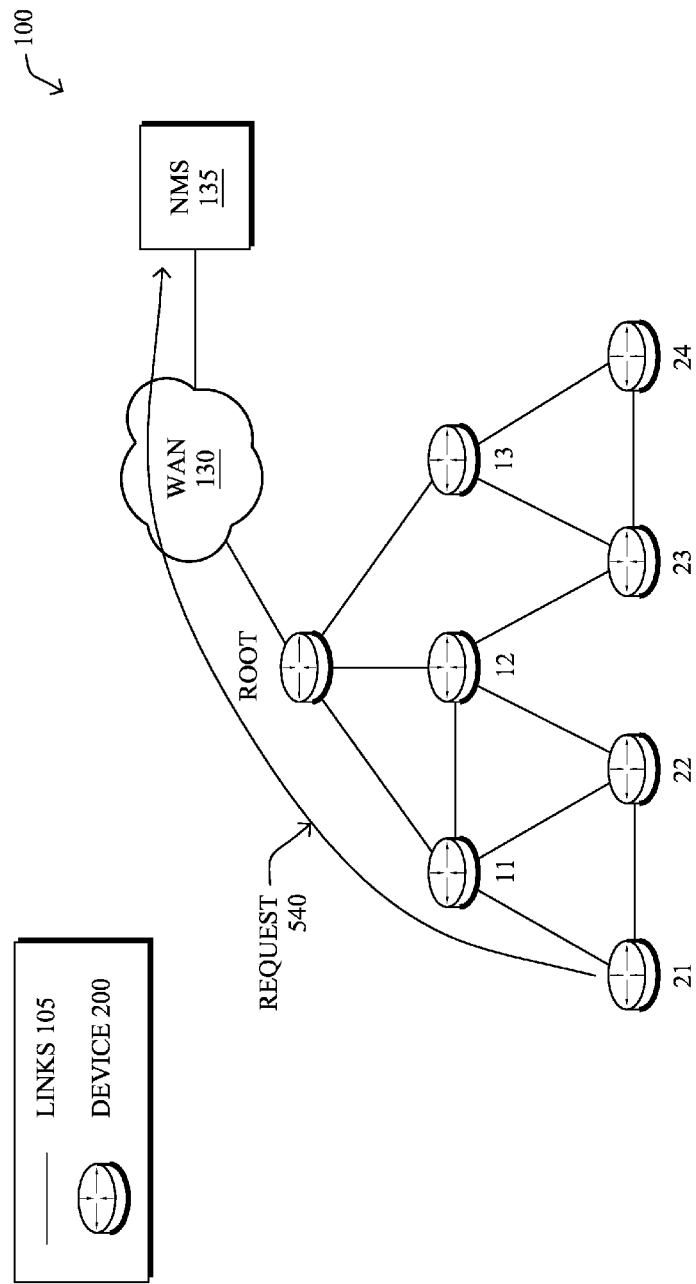
FIGS. 5A-5D illustrate an example localized admission control message exchange.
Figure 5B:
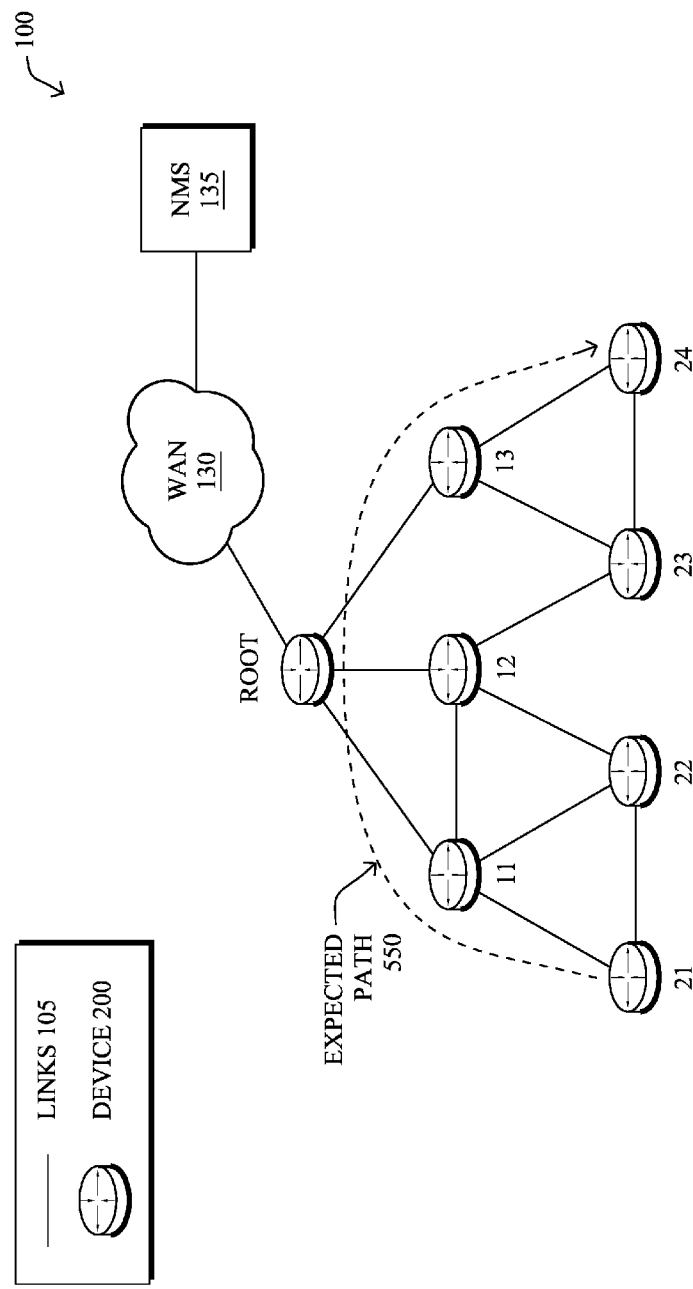
Figure 5C:
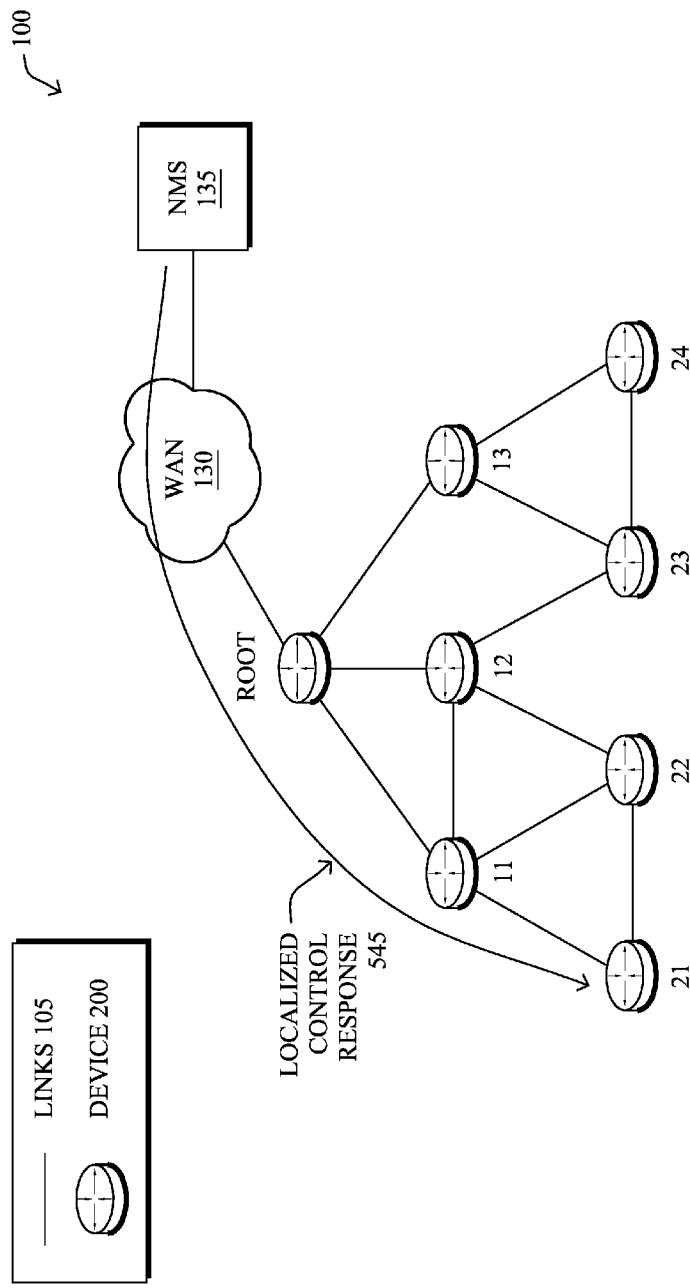
Figure 5D:
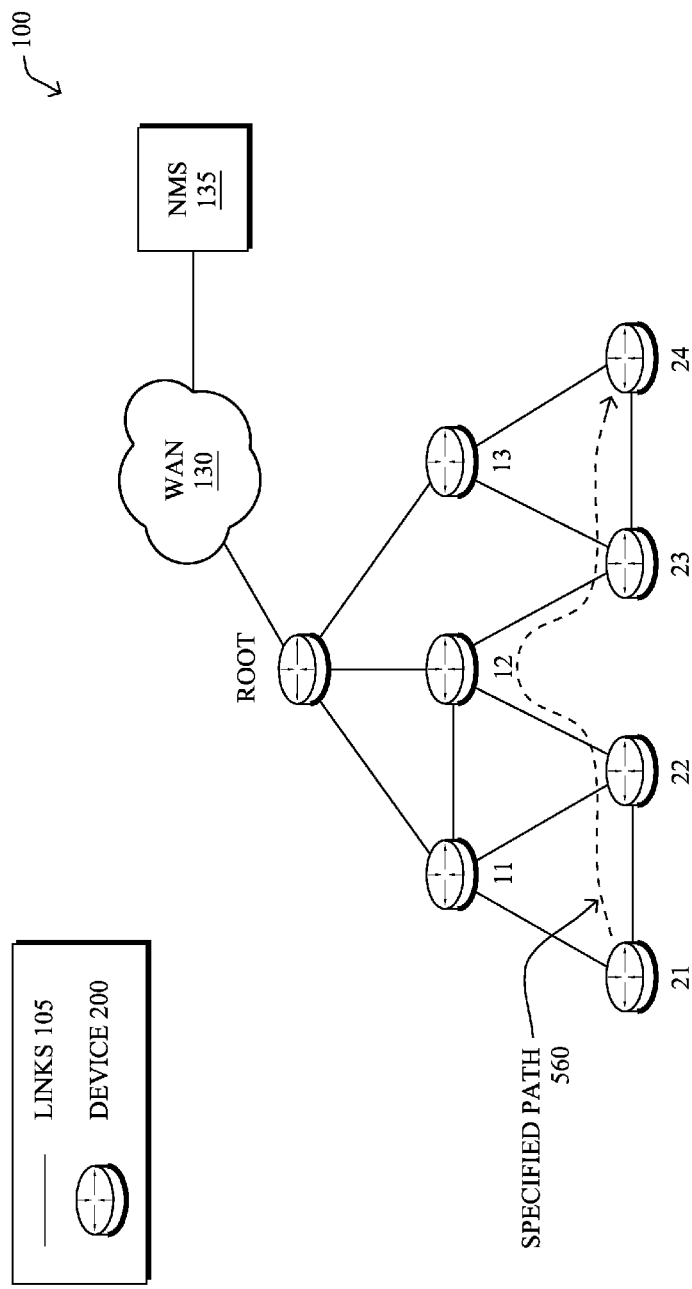

For network-wide control/applications (e.g., AMR), the techniques herein do not require individual devices to make bandwidth reservation requests. Doing so would involve significant signaling overhead to request and release resources. Instead, the NMS dictates general commands or policies for each network-wide application and pushes them to large groups of devices accordingly, as shown in FIG. 4. (Note that if localized applications are expected to operate on the multi-service network, a pool of bandwidth is allocated for such localized applications, as described below).

According to network-wide control, the techniques herein allow the centralized NMS to control admissions in the network based on the state information reported by each individual device, as noted above. Once the centralized NMS controller computes a network state change, a new Call Admission Control (CAC) policy is propagated throughout the network (control messages 440). Illustratively, the routing protocol could be used to that end (e.g., RPL would then reset its trickle timer and the network state would be reported in a newly defined TLV carried in a DODAG Information Object or "DIO" message). Alternatively, the central controller may send a new multicast message to relevant LLN devices in the network. That is, it is not required to use the routing protocol for network scope state propagation.

Upon receiving the new CAC policy, each node then applies the updated CAC policy to incoming and self-generated traffic. The CAC policy may be fully described in the control packet itself. An alternative approach may be to distribute the set of CAC policies during bootstrapping (e.g., using DHCP) and instead use a compact identifier when switching between policies to reduce control traffic overhead. An example policy may include: traffic marked with DS bytes="C" (used for example to identify low priority meter readout) could be dropped in the yellow state where traffic marked with DS byte="C+B" (meter read out+quality report) would be dropped in red state so as to only admit "A" traffic of highest priority (note that the terms C, B, and A are for the sake of illustration to identify class of traffic).

In yet another embodiment, the CAC policy may specify a subset of the nodes the CAC policy applies to; for example, "all nodes in the network" (a highly likely policy in the context of LLNs), "all nodes with a rank higher than X" (so as to only stop admitting the traffic from nodes deep in the network), "all nodes such as Hash (IP_address)=Y (in order to filter out the traffic from a subset of nodes, should the NMS be able to map the IP address with a specific Hash to locate nodes to which the CAC policy should be applied to), etc. Other types of policies/admission controls are available, and those mentioned herein are merely examples. For instance, generally, admission may be directed (decided and acted upon) based on various factors, such as a traffic type (e.g., Class of Service), traffic destination, traffic source, traffic priority, node type, node location, node priority, etc. Note that in the event a packet is not marked, if CPU processing is available, the nodes could also perform some deep packet inspection for admission control policies.

Note also that implicit CAC in this manner allows nodes at the edge of network to potentially make use of backup/alternate route (e.g., 3G links) to send the traffic that cannot be safely admitted in the LLN. This would potentially create the opportunity to avoid dropping the traffic within the LLN by redirecting it to an alternate path via a different network, if the policy allows it.

The network-wide control approach is purposefully non-granular so as to keep the mechanism efficient, i.e., simple enough and utilizing very lightweight state maintenance, which is of the utmost importance in highly constrained networks such as LLNs.

For localized admission control, on the other hand, a goal of the techniques herein is to provide a lightweight mechanism to allocate per-flow state, i.e., where localized control is per flow. As illustrated in FIGS. 5A-5D, for instance, and as described in greater detail below, a particular device/node (e.g., node 21) may send a request 540 (FIG. 5A) to the NMS 135 (or root node) to admit a new flow into the LLN. Upon receiving the request, the NMS responds to the particular node with a particular directed admission decision (messages 545, FIG. 5C). As mentioned below, the particular directed admission decision may be based first on an expected path 550 (FIG. 5B) of the new flow through the LLN and the admission state of the LLN as it relates to the expected path. In particular, as detailed below, localized control may comprise directing admission by dropping the flow, queueing the flow, and rerouting the flow (e.g., over new specified path 560, FIG. 5D).

In particular, for localized applications (e.g., Distribution Automation), individual devices (e.g., DA Gateways) may send a Call Admission Control (CAC) request 540 to the NMS without requiring any further in-band signaling. Such an approach is different when compared to existing approaches, such as existing RSVP-based networks, where a router would perform a constrained shortest path first (CSPF) computation, or would simply follow the IGP path to send a RSVP Path message to reserve bandwidth.

In accordance with the embodiments related to localized control, in addition to (or as an alternative to) the network state information obtained and analyzed above, the NMS according to the techniques herein keeps track of the current booking state for all active flows for which a request has been accepted. Using this booking state, the size of a localized allocation pool (a network/admission state), and the routing topology of the network (unless the requester provides the computed path itself), the NMS can respond to the request in a number of ways (in response/control 545). An illustrative detailed operation of the localized allocation process is as follows:

1) The set of traffic flows that require bandwidth reservation using an explicit CAC request is determined by policy configured on the LLN device (such a policy could be distributed by the NMS during the bootstrapping phase).

2) For traffic flows that require explicit bandwidth reservation, the device sends a CAC request 540 to the NMS, e.g., in the form of a unicast IPv6 packet, reporting the nature of the flow (i.e., destination address(es) for the traffic and required bandwidth) along with a requested lease time for the flow.

3) After receiving the CAC request, the NMS first computes the likely path(s) 550 that the flow will take using the source and destination address(es) to determine what links and nodes will be affected if the request is admitted and check if the request can be satisfied. The NMS can utilize information fed by its local routing topology database fed by a routing protocol such as RPL or any other routing protocols (or the NMS may actually be privy to the information as it is executed on a root node). Gathering the routing topology allows the NMS to compute the path that will be followed by the flow for which a request is being received. In yet another embodiment, the path followed by the flow could be provided in the request by the node initiating the request.

4a) If the request can be satisfied (the bandwidth pool is not depleted), the NMS would locally withdraw the available bandwidth from its localized pool (e.g., a data structure 245) for the period of time reported in the request. The NMS then sends a positive reply 545 to the requester.

4b) If the request cannot be satisfied, the NMS could reply in the following ways:

4b-1) Send a negative reply, 4b-2) Determine if the request could be satisfied at a later stage knowing when other pending/accepted requests would release network capacity. In this case, a positive reply is sent to the requester along with a start time indicating when the device may begin using the requested bandwidth. This effectively allows for distributed flows scheduling, thus queueing the requests.

4b-3) Determine if the request could be satisfied using alternative paths that do not follow the routing topology. In this case, a positive reply is sent to the requester along with a source route that the device should use in forwarding the traffic (e.g., path 560, avoiding congested/reserved links).

4b-4) Determine if the request could be satisfied by reducing one or more of the network-wide policies in order to grow the localized allocation pool for the corresponding request. In this case, the NMS disseminates the new network-wide policies and sends a positive reply to the requester.

* Note that 4b-2, 4b-3, and 4b-4 are not mutually exclusive, and one or more of the techniques may be used to satisfy a request. Also note that the use of QoS mechanisms to prioritize the traffic is orthogonal to implicit CAC. Indeed, if two classes of traffic share localized allocation pool it is still possible/interesting to enable traffic prioritization within each bandwidth pool.

5) The NMS maintains the local reservations and releases network capacity upon the expiration of local times reflecting the capacity reservation requests. Note that releasing local reservations does not require any explicit signaling, as they are lease-based. Note also that in an alternative embodiment, signaling may, in fact, be used to release the reservations without the use of a timer.

In accordance with still another embodiment or embodiments herein, Field Area Routers (FARs), e.g., root nodes, admit the nodes to join their network and act as a relay between the LLN and the global computer network, illustratively WAN 130. Typically, there can be thousands of nodes (e.g., Smart Meters) that can potentially join an LLN/FAR. There is currently no admission control performed at the FAR based on whether all the LLN traffic (incoming and outgoing) can be accommodated within the available WAN link bandwidth. According to these additional (or alternative) embodiments, therefore, the NMS 135 (or root node/FAR) may determine network state based on resource utilization for a link between the LLN and a global computer network, e.g., a WAN link. Note that, as shown in FIG. 6, there may be a plurality of root nodes (or other types of border routers), and as such, there may be a corresponding plurality of WAN links, now labeled in FIG. 6 as WAN link 605.

Figure 6:
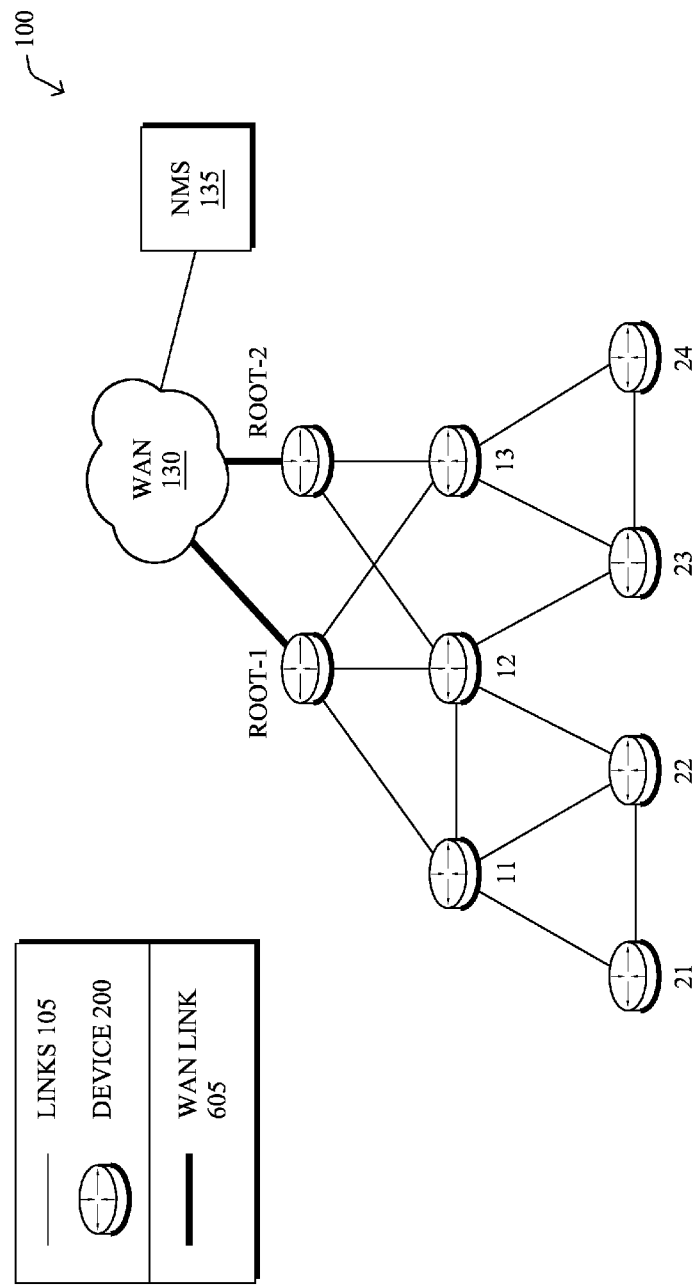
FIG. 6 illustrates an expanded example communication network as in FIG. 1.

A WAN Bandwidth metric (WB metric) may be periodically calculated based on WAN uplink speed, e.g., during off-peak hours, and may be updated whenever network changes are detected (e.g., WAN technology changes (HSPA->HSDPA, etc.), or a primary WAN link goes down and a backup takes over (e.g., root-1 to root-2 in FIG. 6). Note that while two WAN links 605 are shown as coming from two separate border routers, it may be possible in an alternative embodiment to have two WAN links from a single device (e.g., primary and backup links).

In the case of primary and backup WAN links (on one device or between two devices), for instance, if multiple WAN links are active, then the WB metric is the sum of the WB metric of Primary and Backup (thus aggregating the resource utilization for the plurality of links to determine the network state). Also, if only a Primary or a Backup is active, the following configurable options are given to calculate WB metric:

Use a least common bandwidth between the two WAN links;

Use the Primary, and reduce any overload during switchover if the secondary bandwidth is less than the primary; or Use the Primary, and overload the WAN link during switchover if the secondary bandwidth is less than the primary.

Illustratively, as the LLN devices (e.g., meters) register their routing table with the root node (e.g., FAR), the bandwidth used by each device (DB metric) is deducted from the WB metric, and this is maintained as an Available bandwidth metric (AB metric). Devices' DB metrics are either statically configurable, or may be adjusted based on actual usage.

AB metric (Available) is equal to WB metric (WAN bandwidth) during WAN "bring-up" and the FAR deducts DB metric (device) from the AB metric as the devices join the network. Note that the AB metric may be advertised along with PAN size and the routing cost when the FAR sends beacons out to the network. As such, the devices can use the AB metric (an illustrative admission state) as one more criteria when deciding to join a particular LLN (FAR/PAN).

When a device intends to join an LLN (e.g., a meter joining an RF mesh tree of a particular FAR), along with the other security mechanisms, the FAR also does admission control to decide to admit the device in its network, or whether the device/node is advised to join a different LLN (if available). In particular, admission control may also take into account the WAN link bandwidth as a criteria is successful if the sum of the device usage is less than or equal to the WB metric, and fails if the sum of the meter usage is greater than the WB metric.

Note that in certain embodiments there may also be configuration parameters that help decide how much percentage of the total available WAN Bandwidth needs to be allocated for the various needs. The following parameters may be used (e.g., user configurable):

Max Bandwidth to be allocated to the RF network for the device (e.g., Smart Meter) traffic;

Max Bandwidth to be allocated to the RF network to accommodate the devices that migrate from the other LLNs (e.g., other PANs), thus helping to accommodate minor outages in the RF Mesh tree and network variants; and Bandwidth that can be used for other purposes (e.g., Distribution Automation (DA) traffic, FAR control traffic, etc.).

Figure 7:
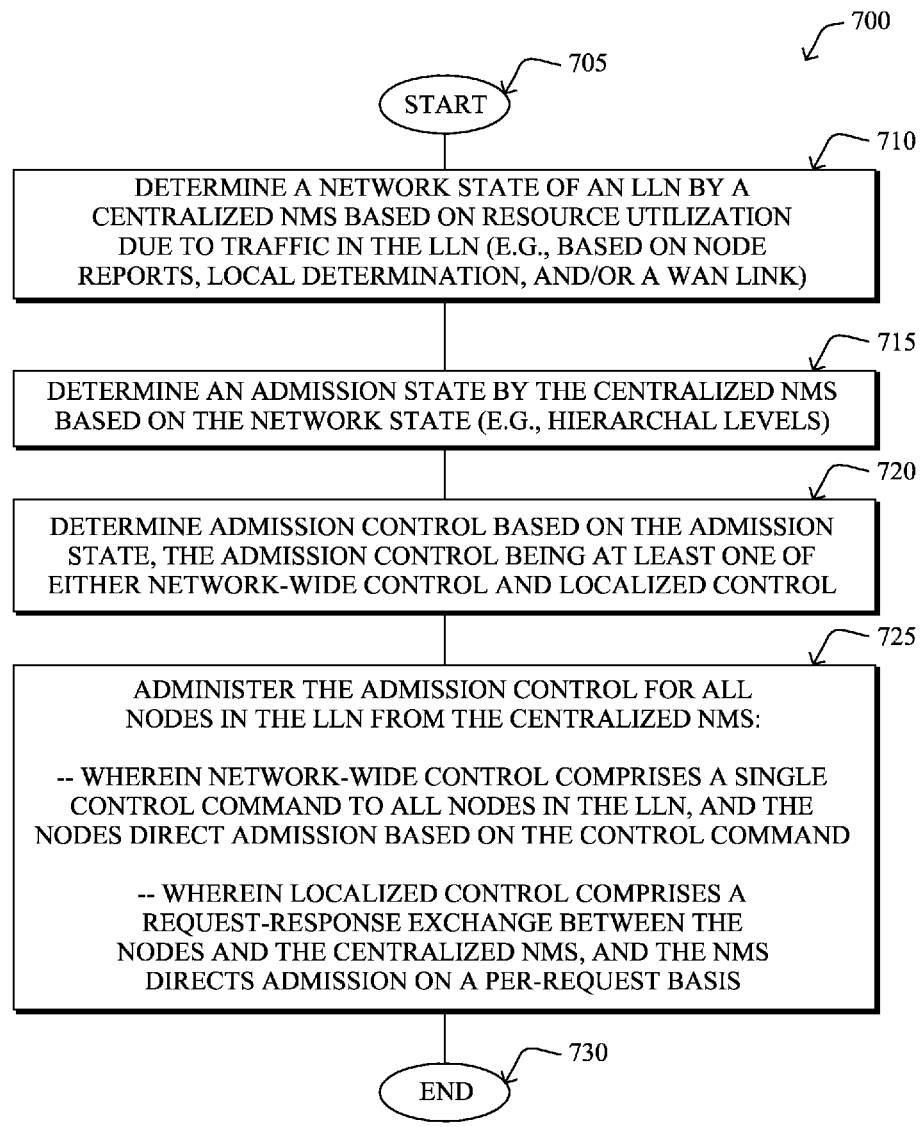
FIG. 7 illustrates an example simplified procedure for efficient admission control in low power and lossy networks (LLNs), e.g., from the perspective of a network management server (NMS)

With respect generally to each of the embodiments described above, FIG. 7 illustrates an example simplified procedure for efficient admission control in LLNs, e.g., from the perspective of an NMS, in accordance with one or more embodiments described herein. The procedure 700 starts at step 705, and continues to step 710, where, as described in greater detail above, the centralized NMS 135 determines a network state of an LLN based on resource utilization due to traffic in the LLN. For example, as mentioned above, this may take the form of receiving node reports 340, a local determination (network monitoring), and/or may be based specifically on WAN link utilization. Based on the network state, the centralized NMS may also determine an admission state in step 715, such as, for example, whether the network or portions thereof may be classified within a certain hierarchal level (e.g., green, yellow, red, as illustrated above).

Based on the admission state, in step 720 the NMS can determine admission control, which can be either network-wide control or localized control, or in certain circumstances, both. Accordingly, in step 725, the centralized NMS can administer the admission control for all nodes in the LLN (that is, the NMS controls all nodes, but not necessarily simultaneously). As described above, the control may be network-wide, in which case the control comprises a single control command 440 to all nodes in the LLN, and the nodes direct admission based on the control command. Alternatively, localized control comprises a request-response exchange between the nodes and the centralized NMS (FIGS. 5A-5D above), and the NMS directs admission on a per-request basis.

The procedure 700 ends in step 730, notably with the option to update network state, produce further admission control, receive more localized control requests, etc.

Figure 8:
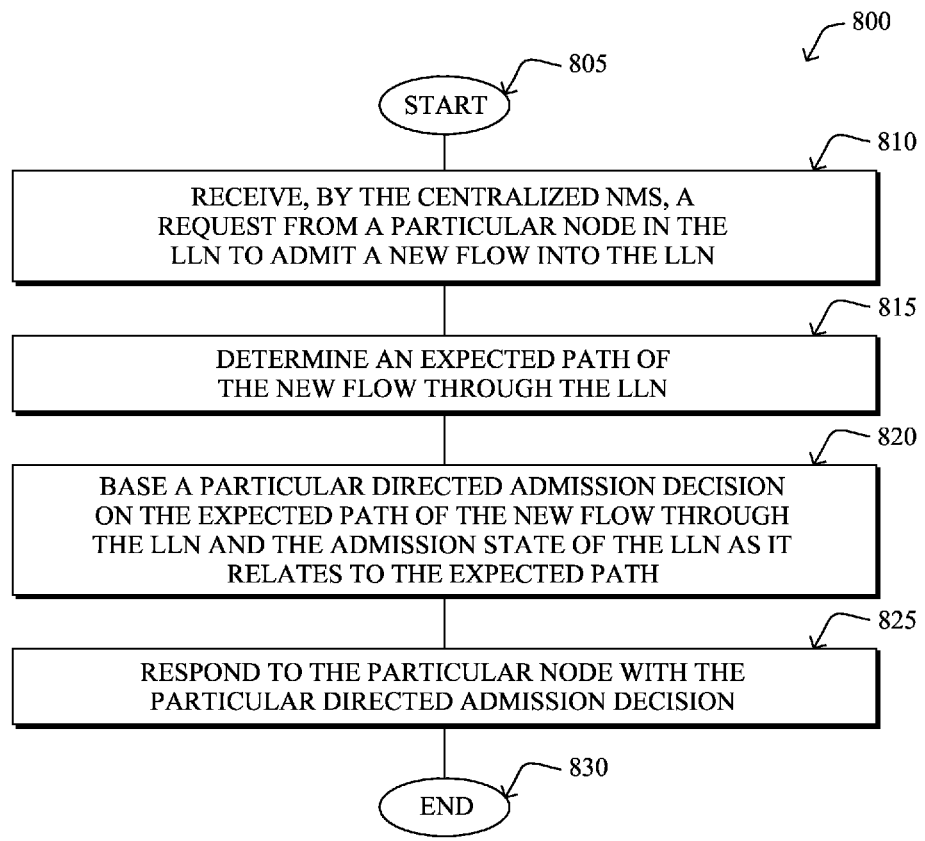
FIG. 8 illustrates an example simplified sub-procedure for efficient admission control.

In addition, FIG. 8 illustrates an example simplified sub-procedure for efficient admission control, in accordance with one or more embodiments described herein, particularly for localized admission control as described above. The procedure 800 starts at step 805, and continues to step 810, where the NMS receives a request 540 from a particular node in the LLN to admit a new flow into the LLN. As such, the NMS may, if not explicitly indicated, determine an expected path of the new flow through the LLN in step 815, and then in step 820 bases a particular directed admission decision on the expected path of the new flow through the LLN and the admission state of the LLN as it relates to the expected path. Accordingly, in step 825, the NMS may respond to the particular node with the particular directed admission decision, and the sub-procedure 800 ends in step 830.

Figure 9:
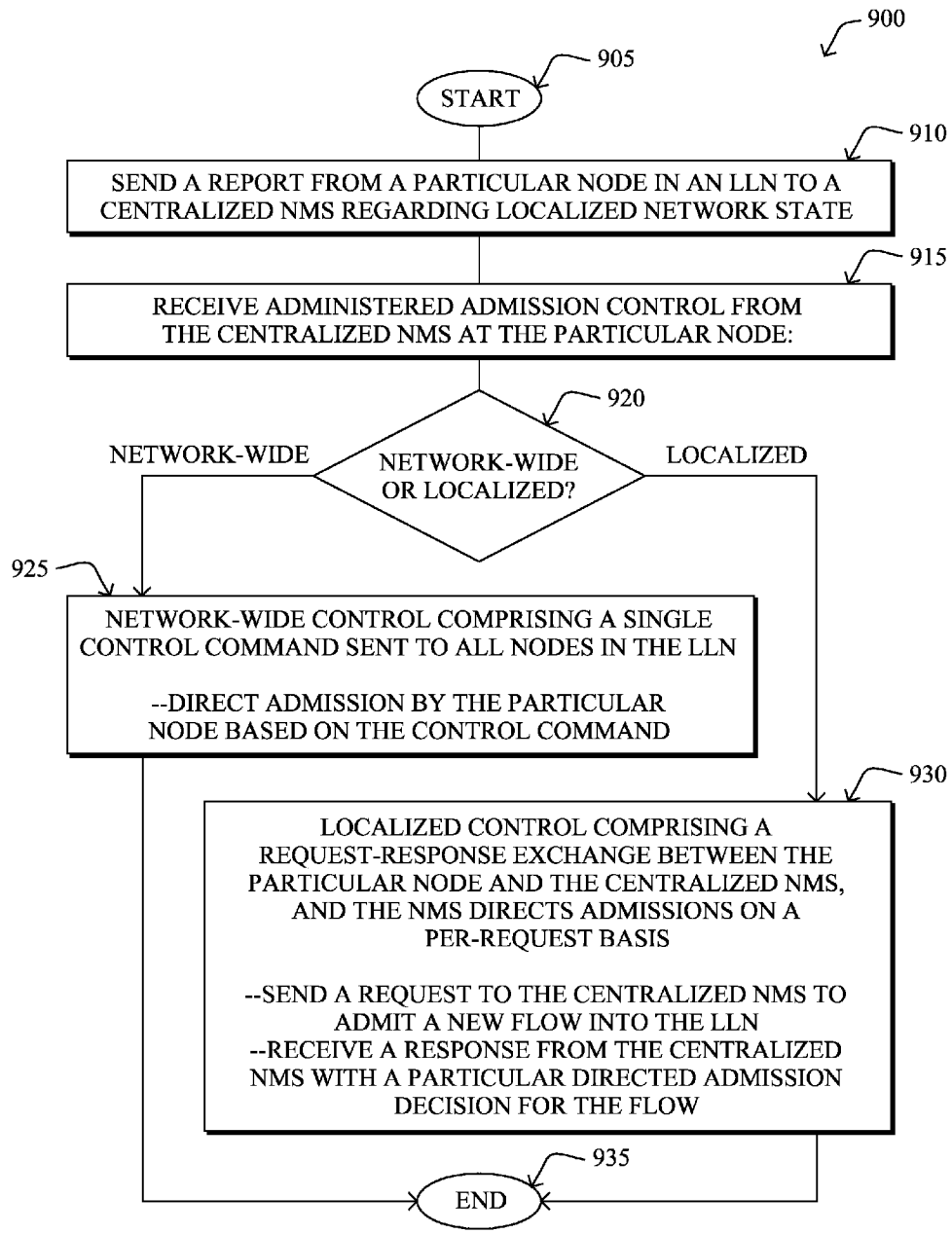
FIG. 9 illustrates another example for efficient admission control in LLNs, e.g., from the perspective of an LLN device.

FIG. 9 illustrates another example for efficient admission control in LLNs, e.g., from the perspective of an LLN device, in accordance with one or more embodiments described herein. The procedure 900 starts at step 905, and continues to step 910, where the device sends a report 340 to a centralized NMS 135 regarding localized network state (e.g., including the link and nodes resources). Further, as described in greater detail above, in step 915 the device (particular node) may receive administered admission control from the centralized NMS, depending upon whether the control is network-wide or localized in step 920.

Specifically, in step 925 for network-wide control, a single control command 440 is sent to all nodes in the LLN, and the particular node directs admission (e.g., of its flows) based on the control command. Conversely, in step 930 for localized control, a request-response exchange may occur between the particular node and the centralized NMS, and the NMS directs admission on a per-request basis. That is, in step 930, the device (particular node) sends a request 540 to the centralized NMS to admit a new flow into the LLN, and receives a response 545 from the centralized NMS with a particular directed admission decision for the flow (e.g., admit, drop, queue, reroute, etc.).

The illustrative procedure 900 ends in step 935, notably with the option to produce more network state reports, or to receive (e.g., request) more admission control from the NMS, accordingly.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The novel techniques described herein, therefore, provide for efficient admission control in LLNs. In particular, the embodiments herein provide various admission techniques, e.g., for network-wide control and/or localized control, that reduces the burden on nodes in an LLN, thus alleviating the constraint on the nodes as well as the links of the LLN.

In particular, as described above, a first illustrative embodiment generally consists of using the NMS to request a lease on network capacity for specific flows, where the NMS illustratively maintains the available bandwidth using a localized allocation pool in the network and concludes whether or not a local per-flow request can be satisfied. According to the reply, the requester may either send traffic (e.g., for and/or after an estimated amount of time, drop the traffic (not sending the traffic in the network thus avoiding congestion), or use an alternate path (e.g., a source route or 3G connection). According to this first illustrative embodiment, the techniques allow for implicit CAC thus avoiding network congestion for a pool of bandwidth in the network and consequently providing bandwidth guarantees to critical flows, without heavy state maintenance and signaling in the network.

Furthermore, in a second illustrative embodiment described above, a discrete network of network states are defined and the centralized NMS is responsible for determining the overall network state reflecting the level of congestion of the network. According to the network state, implicit CAC is performed at the edge of the network so as to determine which traffic is admitted in the network so as to efficiently avoid congestion in the network without requiring heavy state maintenance and expensive buffering in the network. According to this second illustrative embodiment, techniques provide a QoS architecture that avoids heavy signaling and state maintenance typically used by existing mechanisms in more traditional IP networks. Minimizing the amount of control traffic is especially important in LLNs, where the control traffic itself can easily lead to more congestion and queuing delays.

Moreover, in a third illustrative embodiment described above, techniques provide for admission control at the LLN based on the available bandwidth of WAN links 605. These techniques may also provide a load balancing mechanism for LLNs with a plurality of WAN links.

While there have been shown and described illustrative embodiments that provide for efficient admission control in LLNs, it is to be understood that various other adaptations and modifications may be made within the spirit and scope of the embodiments herein. For example, the embodiments have been shown and described herein with relation to LLNs and related protocols, such as RPL. However, the embodiments in their broader sense are not as limited, and may, in fact, be used with other types of constrained networks and/or suitable protocols. Also, while the techniques generally describe admission control by a separate network management system/server (NMS), it is important to again point out that the NMS may be a process 248 located on another node in the network, e.g., in particular, a DAG root device. Further, though various techniques herein have been described as being simultaneously operational or configured on the NMS, certain techniques may be included or excluded from configuration of an NMS or other devices, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining a network state of a low power and lossy network (LLN) by a centralized network management server (NMS) based on resource utilization due to traffic in the LLN;
   determining an admission state, by the centralized NMS, by classifying the network state into hierarchical levels;
   determining, by the centralized NMS, admission control based on the admission state and suitable for traffic flow characteristics of a particular application supported by the LLN, wherein the admission control being network-wide control or localized control;
   administering the admission control for all nodes in the LLN from the centralized NMS,
   wherein the network-wide control comprises propagating a single admission control command policy, determined by the centralized NMS, to all nodes in the LLN, and the nodes directing admission based on the admission control command policy; and
   wherein localized control comprises exchanging a request-response between the nodes and the centralized NMS to request a lease on network capacity for a flow of the particular application, the centralized NMS directing admission on a per-request basis, wherein a pool of bandwidth in the LLN is allocated for localized applications, wherein the request specifies a destination address, required bandwidth and a requested lease time for the flow, and wherein the centralized NMS maintains an available amount of bandwidth using the localized allocation pool in the LLN and concludes whether or not a local per-flow request is satisfied.

2. The method as in claim 1, further comprising:
   receiving a report from each of the nodes in the LLN regarding localized network state; and
   aggregating the received reports to determine the network state of the LLN.

3. The method as in claim 1, further comprising:
   determining network state based on resource utilization for a link between the LLN and a global computer network.

4. The method as in claim 3, further comprising:
   determining resource utilization for a plurality of links between the LLN and the global computer network; and
   aggregating the resource utilization for the plurality of links to determine the network state.

5. The method as in claim 1, further comprising:
   classifying the admission state into one of three or more hierarchal levels; and
   determining the admission control based on the admission state level.

6. The method as in claim 1, wherein the network-wide control further comprises directing admission based on a factor associated with traffic type, traffic destination, traffic source, traffic priority, node type, node location, or node priority.

7. The method as in claim 1, wherein admission control comprises directing whether a node is advised to join a different LLN.

8. The method as in claim 7, wherein the admission state is a metric used by nodes when determining which LLN to join.

9. The method as in claim 1, wherein localized control further comprises:
   basing a particular directed admission decision on an expected path of a new flow through the LLN and the admission state of the LLN as it relates to the expected path.

10. The method as in claim 1, wherein the localized control comprises directing admission control by dropping the flow, queuing the flow, or rerouting the flow.

11. An apparatus, comprising:
    one or more network interfaces to communicate with a low power and lossy network (LLN);
    a processor coupled to the network interfaces and adapted to execute one or more processes; and a memory configured to store a centralized network management server (NMS) process executable by the processor, the process when executed operable to:

determine a network state of the LLN based on resource utilization of due to traffic in the LLN;

determine an admission state by classifying the network state into hierarchical levels;

determine admission control based on the admission state and suitable for traffic flow characteristics of a particular application supported by the LLN, wherein the admission control being at least one of either network-wide control or localized control;

administer the admission control for all nodes in the LLN by the centralized NMS, wherein the network-wide control comprises propagating a single admission control command policy, determined by the centralized NMS to all nodes in the LLN, and the nodes directing admission based on the admission control command policy; and wherein the localized control comprises exchanging a request-response between the nodes and the centralized NMS process to request a lease on network capacity for a flow of the particular application, and the centralized NMS process directing admission on a per-request basis, wherein a pool of bandwidth in the LLN is allocated for localized applications, wherein the request specifies a destination address, required bandwidth and a requested lease time for the flow, and wherein the NMS process maintains an available amount of bandwidth using the localized allocation pool in the LLN and concludes whether or not a local per-flow request is satisfied.

12. The apparatus as in claim 11, wherein the process when executed is further operable to:

receive a report from each of the nodes in the LLN regarding localized network state; and aggregate the received reports to determine the network state of the LLN.

13. The apparatus as in claim 11, wherein the process when executed is further operable to:

determine network state based on resource utilization for a link between the LLN and a global computer network.

14. The apparatus as in claim 11, wherein the process when executed is further operable to:

classify the admission state into one of three or more hierarchal levels; and determine the admission control based on the admission state level.

15. The apparatus as in claim 11, wherein the network-wide control comprises directing admission based on a factor associated with traffic type, traffic destination, traffic source, traffic priority, node type, node location, or node priority.

16. The apparatus as in claim 11, wherein the admission control comprises directing whether a node is advised to join a different LLN.

17. The apparatus as in claim 11, wherein the localized control further comprises:

basing a particular directed admission decision on an expected path of a new flow through the LLN and the admission state of the LLN as it relates to the expected path.

18. The apparatus as in claim 11, wherein the localized control comprises directing admission by dropping the flow, queuing the flow, or rerouting the flow.

* * * * *